D. Reynolds,
Manf Salt.
No. 99,949.    Patented Feb. 15, 1870.
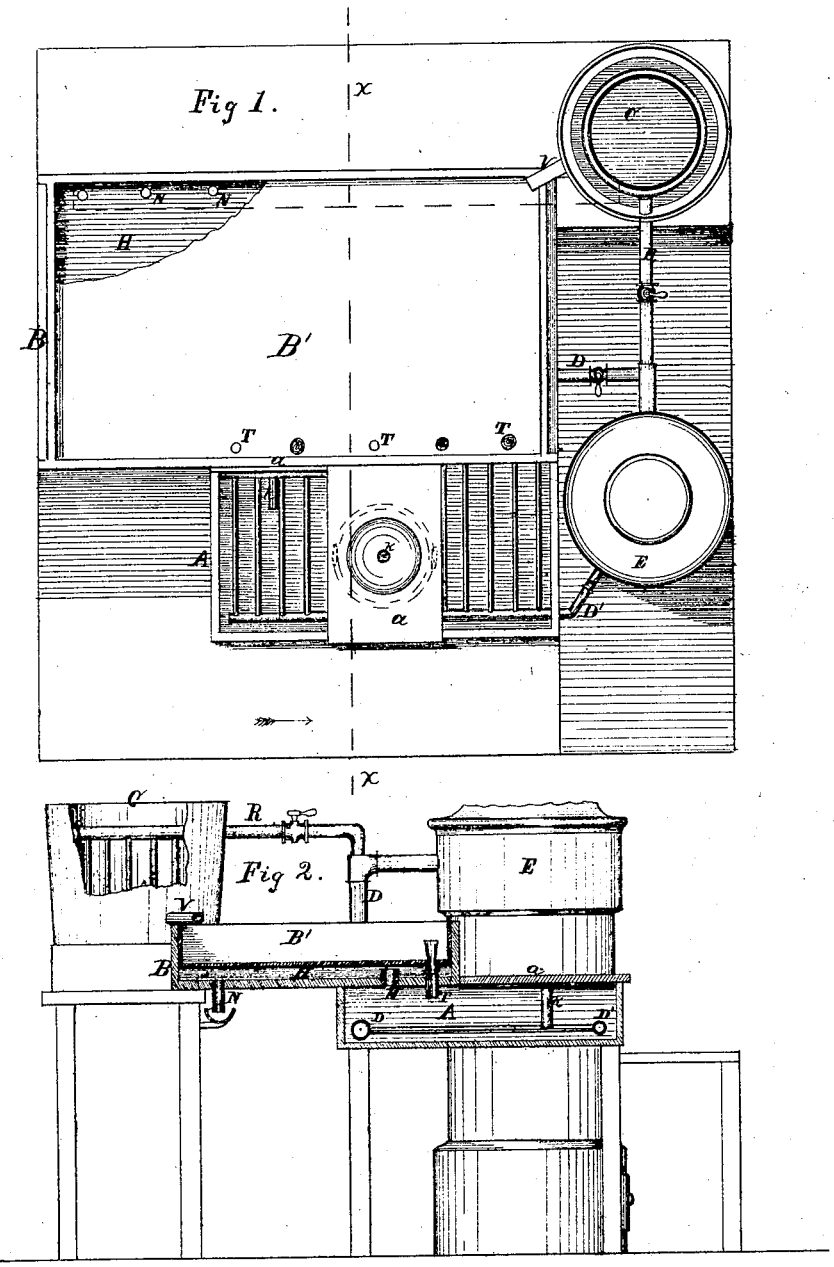

United States Patent Office.

DEXTER REYNOLDS, OF ALBANY, NEW YORK.

Letters Patent No. 99,949, dated February 15, 1870.

IMPROVED PROCESS AND APPARATUS FOR THE MANUFACTURE OF SALT.

The Schedule referred to in these Letters Patent and making part of the same

*To all whom it may concern:*

Be it known that I, DEXTER REYNOLDS, of the city of Albany, in the county of Albany, and State of New York, have invented a certain new and useful Process and Apparatus for the Manufacture of Salt; and I do hereby declare that the following is a full, clear, and exact description thereof, reference being had to the accompanying drawings making part of this specification, in which—

Figure 1 is a plan view of my apparatus represented as applied to or taking the place of the kettles and arches of an ordinary salt-block.

Figure 2 is a transverse section showing those portions to the right of the dotted line $x$, fig. 1.

The main object of my invention, the nature of which will be understood by reference to the drawings and specifications, is to remove, in a tub or vessel entirely separate from the vessel or vessels in which the brine is concentrated or reduced to salt, the gypsum or other impurities in salt brines which are precipitated by either heat or concentration, or the joint effects of both, as effectually, if not more so than is now done by "panning," where the brine is boiled in kettles or by any other method; thus rendering it practicable to make good salt in shallow pans or vats heated by steam or otherwise, from brines which contain such impurities, which cannot now be done; and thereby also promoting a more rapid evaporation and consequently a greater and more economical concentration of the brine or reduction thereof to salt in the evaporator, which latter cannot now be done advantageously on account of the presence of such impurities.

The vats A and B are located either upon the walls of the present salt-blocks or upon supports specially provided therefor, and the latter may be arranged with reference to the former similarly to the apparatus patented by J. J. Sherman, of Albany, New York, February, 16, 1869, reissued May 11, 1869, in which vapor from A passes through suitable openings or pipes into a chamber in B and heats additional brine, or it may be made similarly to the apparatus described in the patent to myself, June 15, 1869.

The purifier C is placed conveniently above the upper vat B, and it is proposed to remove in it the gypsum and other impurities by boiling, by means of steam passing through a series of pipes or other receptacles placed therein, and so arranged as to allow as little surface for the deposit of such impurities thereon as possible, to affect the heat passing therefrom.

The pipe R conveys steam to it from the boiler E, and the opposite extremity thereof conveys the condensed steam back to the boiler after it has given up its heat to the brine.

The purified brine is drawn off by the pipe V into the pan B', which pipe can be so arranged as also to allow such purified brine to be drawn direct into A.

The vat B is constructed of any non-conducting material, and a pan, B', of any conducting material is placed within it, leaving a steam-chamber, H, between the bottom of such pan and vat.

The vapor from brine boiled in the vat A rises through openings or pipes M to the steam-chamber H, and being condensed by giving up its heat to brine in the pan B', the condensed steam passes off through pipes N to a gutter or pipe, by which it is carried to a suitable reservoir, whence it may be pumped as desired into the boiler.

By means of pipes T T, provided with suitable plugs or cocks, the concentrated brine may be let down into the vat A to be therein reduced to salt; such pipes being of sufficient number and size to admit of the speedy emptying of the pan B'.

The brine in vat A is heated by a series of pipes arranged in any suitable and effective manner, taking steam from the boiler through D and returning the condensed water through D'.

The vat A being provided with covers, or so placed as to be closed by covers attached to vat B, such covers are capable of being easily opened or removed, so as to permit free access to such vat A for the removal of salt, and so arranged as, when closed by the interposition of felting or otherwise, to prevent the escape of any steam rising from the surface of the brine being reduced to salt in A, otherwise than up the pipe M through the steam-chamber H, (one of such covers being shown down and one raised in fig. 1.)

In the covers a hole is made, with a pipe, K, extending from the bottom of the covers into such hole, and sufficiently long to extend, when the covers are down, below the surface of the brine being boiled in such vat, (and such hole on the upper side of such covers and a suitable distance therefrom being surrounded by cleets, or otherwise arranged so that when a basket of salt is set thereupon to drain, the drainage shall pass through such hole and pipe to the vat below,) and prevent the escape of any steam from such vat thereby.

It will be observed that instead of using the evaporator in connection with kettles heated by the direct action of fire, as contemplated by both Sherman and myself in the patents hereinbefore referred to, it is proposed to use the same in connection with vats heated by steam, and to supply the evaporator with purified brine coming hot from the purifier, instead of crude brine coming cold from the logs.

It will also be observed that in place of the pan B' a metallic diaphragm may be substituted; or in the place of such pan or diaphragm, pipe M, steam-chamber H, and pipe N, any pipes, tubes, cases or receptacles for steam receiving at one end the steam rising from A and at another allowing the condensed steam to pass away, and being surrounded by and giving up its heat to the brine in B.

When the pan B' or diaphragm substituted therefor is necessarily large, supports therefor may be provided on the bottom of B.

The pipe M should extend sufficiently above the bottom of B to prevent the return thereby of any condensed steam.

All the pans and pipes should be painted with red lead or otherwise protected from rusting, to increase their durability.

This apparatus and process is an improvement upon the apparatus and process patented either by said Sherman or myself, hereinbefore referred to, in several important particulars.

First, in increasing the rapidity of the evaporation in such evaporator by the previous removal of the gypsum from the brine, the presence of which in the brine when it does not come to a boil, as it does not in the evaporator, having been formed by its crystalization on the surface to greatly retard such evaporation. And such previous removal of gypsum and other impurities also permits of the reduction of the brine to salt in the evaporator, which could not otherwise be advantageously done, as the reduction of the brine to salt without the gypsum being first removed would greatly impair, if it did not entirely destroy, the marketable value of the salt so made.

Second, it is more conveniently applied to and within the limits of the present salt-blocks, and while increasing their economical working also adds to their capacity for production, for there is no space in the present salt-blocks to locate the evaporators in connection with kettles, and their employment in connection with about one-third of the kettles which do not come to a boil owing to their distance from the fire, would be of but little, if any, value; whereas the vat A, if made of about half the length of one row of kettles and heated by steam, and the vat B of the length of the other row, and of such widths as not to interfere with the present alley-ways, will equal in production all the kettles in the block.

Third, it adds to the durability of the evaporator, it having been found, in practice, that placing the vats directly upon kettles subjected to the direct action of fire, they soon become charred from the great heat of the edges of the kettles, and would be entirely destroyed by continuous use in a very short time; whereas when placed over vats heated by steam their durability is indefinitely increased.

Fourth, the evaporators being placed over kettles, or with covers attached placed over kettles, which kettles made their salt at different times, and no provision being made to ascertain when the salt was so made other than by raising the covers, a great amount of additional labor was caused thereby, or the danger incurred from neglect of destroying the kettles themselves.

Fifth, by the substitution of a steam-generator for the present method of heating the brine, we are enenabled to obtain the best effects from the combustion of fuel, as it is well known that a boiler constructed upon the best principles utilizes the heat of fuel more perfectly than any other device.

Sixth, the use of my improved apparatus and process results in the saving of fuel and labor now incurred every eight or ten days, of letting down the fires and removing the deposits called bitterns, which adhere to the kettles.

It is evident that where brines do not contain gypsum or any impurities that can be precipitated by boiling and slight concentration, the tub C herein described as the purifier can also be advantageously employed in connection with the evaporator and steamvat, to bring to a boil and concentrate an additional amount of fresh brine to be let down to the evaporator or to the steam-vat, by the use of the steam from the boiler shut off from and not being required for use in the steam-vat during the removal of salt therefrom, adding thereby largely to the production of salt in a given time from fixed capacities of evaporator, steam-vat, and boiler, and utilizing the heat under the boiler during that time to the best advantage.

It has been found in practice, that the evaporator receiving the brine at 60° temperature, in about one hour the temperature of the brine therein was raised to about 192° and there remained until the covers were opened and salt removed from the kettles, a period of four or five hours, depending on the duration of the boil of the kettle; that up to the time this temperature was reached, the steam passing from the kettle was condensed by the evaporator and passed off freely as water by the pipe N, but thereafter but little water, comparatively, but a large amount of steam passed off by the pipe N, showing that the steam was not utilized, and although unable to raise the temperature higher, was more than sufficient to maintain it thereat. As one method of utilizing this steam, the brine in the evaporator can be kept agitated by any simple mechanical device; this agitation will, as is well known, increase the evaporation, but at the same time tend to lower the temperature, which lowering will be restored by the surplus steam which would otherwise escape, and the steam can be thus utilized.

Having now described the nature, form, and peculiar advantages of my invention in general, I will describe its practical operation.

The crude brine is first let into the purifier C and the steam admitted from the boiler as the brine is brought to a boil, and a slight concentration obtained; the gypsum or other impurities will be precipitated, and on the steam being shut off will settle to the bottom; the purified brine to the amount required is then drawn off into the pan B', and thence through the pipes T and the vat A, and a like amount, or as required, let down into B' from the purifier. The steam is then admitted to the vat A and the covers thereto closed, and the brine therein reduced to salt; the covers are then raised and the salt removed, and while being so removed the steam is shut off therefrom, and admitted to the tub C to heat and purify a fresh supply of brine therein, as before.

After the removal of salt from the vat A the concentrated brine is let down thereto from the pan B' for the purpose of reduction to salt, the covers again closed, steam shut off from the purifier and let on to the vat A, and the purified brine in C let down to the pan in B.

Brine can also, if desired, be let down direct from the purifier to both vats A and B, and in the former reduced to salt by the action of the steam from the boiler, and in the latter, although more slowly, by the action of the steam escaping from the surface of the brine being boiled in A.

I do not mean to claim or confine myself to any size, shape, number, or position of the vessels, tubs, vats, or pipes therein or therefrom to be used, as it is evident that these can be modified to any extent and still produce the same substantial results and operate substantially in the same manner; but What I do claim as my invention, and desire to secure by Letters Patent, is—

The vessels A B and C when constructed and adjusted in connection with a steam-generator, so as to operate substantially in the manner and for the purposes herein described.

DEXTER REYNOLDS.

Witnesses:
GEO. T. PARKER,
F. H. CLEMENT.